United States Patent [19]

Motosugi et al.

[11] 4,314,529
[45] Feb. 9, 1982

[54] INTAKE SYSTEM OF A MULTI-CYLINDER INTERNAL COMBUSTION ENGINE

[75] Inventors: Katsuhiko Motosugi; Hiroshi Takahashi; Shuhei Toyoda, all of Toyota; Toshiaki Konomi; Hideaki Matsui, both of Susono, all of Japan

[73] Assignee: Toyota Jidosha Kogyo Kabushiki Kaisha, Toyota, Japan

[21] Appl. No.: 35,342

[22] Filed: May 2, 1979

[30] Foreign Application Priority Data

Jul. 31, 1978 [JP] Japan ............................... 53-92555

[51] Int. Cl.³ ...................... F02B 29/02; F02B 31/00
[52] U.S. Cl. ............................. 123/52 MB; 123/308; 123/442
[58] Field of Search ............ 123/75 B, 30 C, 119 DB, 123/124 R, 52 M, 52 MB

[56] References Cited

U.S. PATENT DOCUMENTS

| | | | |
|---|---|---|---|
| 2,727,502 | 12/1955 | Grillet et al. | 123/52 M X |
| 3,359,958 | 12/1967 | Von Seggern et al. | 123/75 B |
| 3,505,983 | 4/1970 | Hartel | 123/52 M |
| 3,561,412 | 2/1971 | Yagi et al. | 123/124 R X |
| 3,664,316 | 5/1972 | Garcea | 123/119 DB X |
| 3,814,069 | 6/1974 | Croft et al. | 123/442 X |
| 4,194,474 | 3/1980 | Endo | 123/308 X |
| 4,196,701 | 4/1980 | Tamura et al. | 123/308 |
| 4,214,561 | 7/1980 | Matsumoto et al. | 123/432 |

FOREIGN PATENT DOCUMENTS 1153559  5/1969  United Kingdom ............ 123/52 M

Primary Examiner—Tony M. Argenbright
Attorney, Agent, or Firm—Kenyon & Kenyon

[57] ABSTRACT

A multi-cylinder engine comprising a carburetor housing forming therein at least two branch intake passages. Each of the branch intake passages is connected to a respective intake port. A throttle valve of the carburetor is provided for each cylinder. Each of the throttle valves is arranged in the respective branch intake passage. A single common passage and branch connecting passages which are connected to the common passage are provided. Each of the branch connecting passages opens into the respective intake port in the vicinity of the rear face of the valve head of the corresponding intake valve.

15 Claims, 8 Drawing Figures

INTAKE SYSTEM OF A MULTI-CYLINDER INTERNAL COMBUSTION ENGINE

DESCRIPTION OF THE INVENTION

The present invention relates to an intake system of a multi-cylinder internal combustion engine.

Particularly in a gasoline engine, in order to obtain high output power by increasing the volumetric efficiency when the engine is operating at high speed under a heavy load, the shape of each intake port is constructed to have as small a flow resistance as possible. Although, in the case wherein the intake port has such a shape, strong turbulence is spontaneously created in the combustion chamber of the engine when the engine is operating at high speed under a heavy load, so that the burning velocity is sufficiently increased, when the same engine is operating at low speed, a satisfactorily strong turbulence is not created in the combustion chamber, thus resulting in a problem in that a sufficient increase in the burning velocity is not obtained.

To create a strong turbulence in the combustion chamber when an engine is operating at low speed, there is a known method of compelling a swirl motion in the combustion chamber by using a helically-shaped intake port or by using a shroud valve. However, in the case wherein such a method is adopted, the flow resistance to the mixture fed into the cylinder is increased, the volumetric efficiency is reduced when such an engine is operating at high speed under heavy load. In addition, an engine capable of creating a strong turbulence in the combustion chamber has been proposed in which the intake passage to each cylinder comprises a main intake passage having a relatively large cross-sectional area and an auxiliary intake passage having a relatively small cross-sectional area, the latter opening into the former at the intake port of the cylinder. In this engine, the mixture is fed into the combustion chamber from the auxiliary intake passage via the intake port when the engine is operating under light load; as a result of the small flow cross section of the auxiliary intake passage, the mixture spouts at high velocity from the auxiliary intake passage to produce turbulence in the combustion chamber. On the other hand, when the engine is operating under heavy load, the mixture is fed into the combustion chamber via the main intake passage. In this engine therefore, it is possible to produce a strong turbulence in the combustion chamber when the engine is operating at low speed under light load, while ensuring a high volumetric efficiency when the engine is operating at high speed under heavy load. However, this engine has drawbacks in that the construction of a mechanism for switching the mixture from the main intake passage to the auxiliary intake passage is complicated, and it is impossible to produce a strong turbulence in the combustion chamber when the engine is operating at low speed under heavy load.

An object of the present invention is to provide an intake system of an internal combustion engine, which has a simple construction and which is capable of creating a strong turbulence in the combustion chamber independently of the engine speed under light load while ensuring a high volumetric efficiency when the engine is operating at high speed under heavy load.

According to the present invention, there is provided an internal combustion engine having a plurality of cylinders, each cylinder having a combustion chamber and an intake valve which has a valve head, the engine including at least one intake passage common to at least two cylinders and comprising a collecting portion having an inlet; at least two branch intake passages branched off from the collecting portion, each of the branch intake passages being connected to a respective one of the combustion chambers via a corresponding one of the valves; fuel supply means arranged in the inlet of the collecting portion; at least two branch connecting passages each having an opening which opens into a respective one of the branch intake passage; a common passage connecting each of the at least two branch connecting passages; and valve means arranged in the branch intake passages at a position upstream of the openings of the branch connecting passages and opened in accordance with an increase in the level of the load of the engine.

The present invention may be more fully understood from the description of preferred embodiments of the invention set forth below, together with the accompanying drawings.

DESCRIPTION OF PREFERRED EMBODIMENTS

Figure 1:
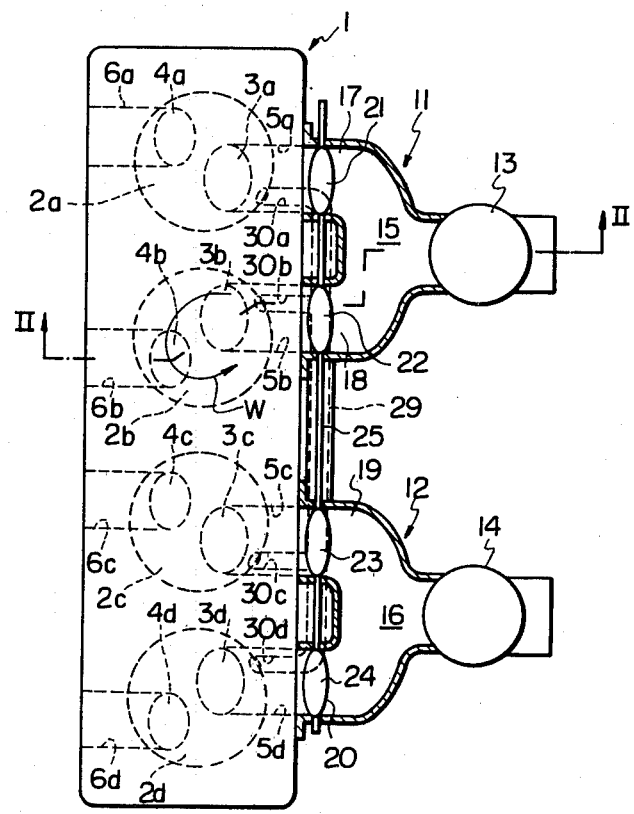
FIG. 1 is a plan view, partly in cross-section, of an embodiment of an engine according to the present invention.
Figure 2:
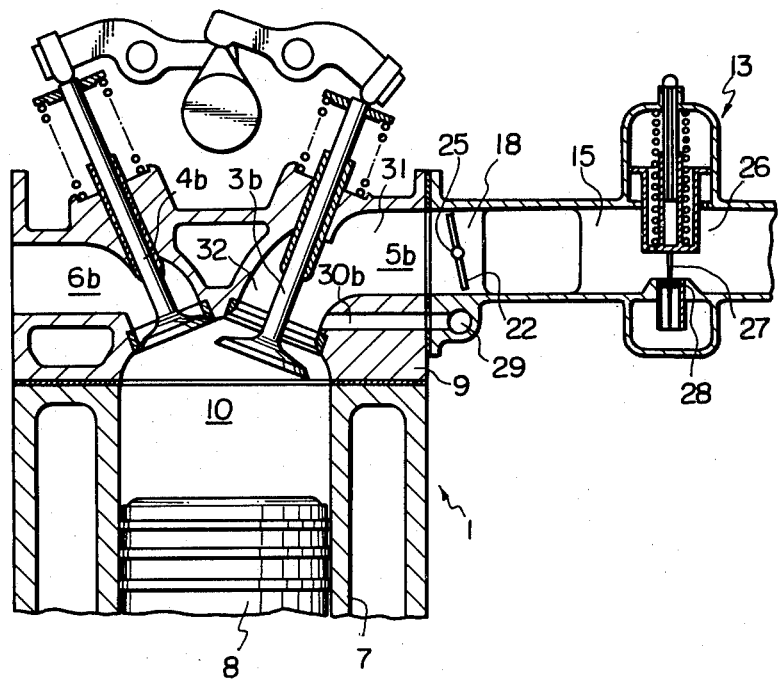
FIG. 2 is a cross-sectional side view taken along the line II—II in FIG. 1.

Referring to FIG. 1, 1 designates an engine body; $2a$, $2b$, $2c$, $2d$ designate No. 1 cylinder, No. 2 cylinder, No. 3 cylinder and No. 4 cylinder, respectively; $3a$, $3b$, $3c$, $3d$ designate intake valves; $4a$, $4b$, $4c$, $4d$ exhaust valves; $5a$, $5b$, $5c$, $5d$ intake ports; and $6a$, $6b$, $6c$, $6d$ exhaust ports. Referring to FIG. 2, reference numeral 7 designates a cylinder block, 8 a piston which is reciprocally movable in the cylinder block 7, 9 a cylinder head fixed onto the cylinder block 7, and 10 a combustion chamber. A spark plug (not shown) is arranged in the combustion chamber 10.

Referring to FIGS. 1 and 2, a pair of carburetor housings 11, 12 is mounted on the engine body 1, and variable venturi type carburetor bodies 13, 14 are arranged in the carburetor housings 11, 12, respectively. Each of two intake passages 15, 16 formed in the carburetor housings 11, 12 is divided into two branch intake passages 17, 18 and 19, 20, respectively, and each of the branch intake passages 17, 18, 19, 20 is connected to the respective intake port $5a$, $5b$, $5c$, $5d$. Throttle valves 21, 22, 23, 24 of the carburetor bodies 13, 14 are arranged in the corresponding branch intake passages 17, 18, 19, 20 and are attached onto a common valve shaft 25. However, instead of being attached onto the common valve shaft 25, the throttle valves 21, 22, 23, 24 may be interconnected to each other by means of a link mechanism (not shown) so that the opening operation of all the throttle valves 21, 22, 23, 24 is controlled at the same time. As is illustrated in FIG. 2, the carburetor body 13 comprises a movable suction piston 26, a movable needle 27 and a metering jet 28. As is well known to those skilled in the art, the suction piston 26 moves up and down so that the vacuum produced in the mixture passage 15 located between the suction piston 26 and the throttle valve 22 is maintained at a constant level.

A common passage 29 extending in the longitudinal direction of the engine body 1 and having a cross-sectional area which is smaller than that of each branch intake passage 17, 18, 19, 20 is arranged beneath the throttle valves 21, 22, 23, 24. In addition, four branch connecting passages 30a, 30b, 30c, 30d which are connecting to the common passage 29 and each of which has a cross-sectional area smaller than that of the branch intake passages 17, 18, 19, 20 are formed in the cylinder head 9. The branch connecting passages 30a, 30b, 30c, 30d open into the respective intake ports 5a, 5b, 5c, 5d at a position near the rear faces of the valve heads of the corresponding intake valves 3a, 3b, 3c, 3d. The openings of the branch connecting passages 30a, 30b, 30c, 30d are directed to valve gaps formed between the corresponding intake valves 3a, 3b, 3c, 3d and their valve seats when the respective intake valves 3a, 3b, 3c, 3d are opened.

Figure 3:
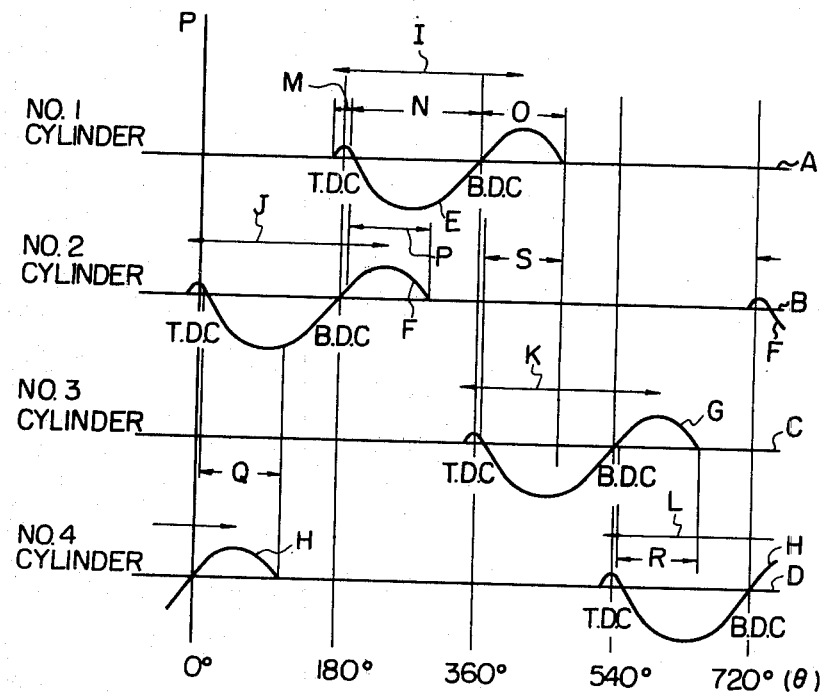
FIG. 3 is a graph showing changes in pressure in the intake port located at a position near the rear face of the valve head of the intake valve.

FIG. 3 illustrates changes in pressure in the intake ports 5a, 5b, 5c, 5d. In FIG. 3, the abscissa $\theta$ indicates crank angle, and the ordinate P indicates pressure in the intake port in the vicinity of the rear face of the valve head of the intake valve (hereinafter referred to as the intake port pressure). In addition, each of the reference lines A, B, C, D indicates the atmospheric pressure. The curved lines E, F, G and H indicate changes in the intake port pressure in the intake ports 5a, 5b, 5c, 5d, respectively, and the arrows I, J, K and L indicate the opening duration of the intake valves 3a, 3b, 3c and 3d, respectively. Referring to the change in pressure in the No. 1 cylinder shown in FIG. 3, the intake port pressure becomes a positive pressure over the range M of the crank angle immediately after the intake valve is opened, and then a vacuum is produced in the intake port of the No. 1 cylinder over the range N of the crank angle in which the piston moves downwards. After this, the intake port pressure again becomes positive over the range O of the crank angle after the piston begins to move upwards. The change in the intake port pressure in the remaining cylinders is the same as that in the No. 1 cylinder. Consequently, during the range P of the crank angle shown in FIG. 3, it will be understood that a vacuum is produced in the intake port of the No. 1 cylinder, and the intake port pressure of the No. 2 cylinder is positive. Similarly, during the range Q of the crank angle, a vacuum is produced in the intake port of the No. 2 cylinder, and the intake port pressure of the No. 4 cylinder is positive; during the range R of the crank angle, a vacuum is produced in the intake port of the No. 4 cylinder, and the intake port pressure of the No. 3 cylinder is positive; and during the range S of the crank angle, a vacuum is produced in the intake port of the No. 3 cylinder, and the intake port pressure of the No. 1 cylinder is positive. Consequently, referring to the curves for the No. 1 cylinder and the No. 2 cylinder shown in FIG. 3, it will be understood that in the first half of the intake stroke of the No. 1 cylinder, the mixture in the intake port 5b of the No. 2 cylinder is fed into the intake port 5a of the No. 1 cylinder via the branch connecting passage 30b, the common passage 29 and the branch connecting passage 30a due to the pressure difference between the vacuum in the intake port 5a and the positive pressure in the intake port 5b. In the same manner, when the No. 2 cylinder is in the intake stroke, the mixture in the intake port 5d of the No. 4 cylinder is fed into the intake port 5b of the No. 2 cylinder via the branch connecting passage 30d, the common passage 29 and the branch connecting passage 30b; when the No. 4 cylinder is in the intake stroke, the mixture in the intake port 5c of the No. 3 cylinder is fed into the intake port 5d of the No. 4 cylinder via the branch connecting channel 30c, the common passage 29 and the branch connecting passage 30d; and when the No. 3 cylinder is in the intake stroke, the mixture in the intake port 5a of the No. 1 cylinder is fed into the intake port 5c of the No. 3 cylinder via the branch connecting passage 30a, the common passage 29 and the branch 30c. As mentioned above, due to the difference between the intake port pressures in the intake ports 5a, 5b, 5c, 5d, the mixture is spouted from the opening of the respective channel branch 30a, 30b, 30c, 30d of the cylinder which is in the intake stroke into the corresponding intake port 5a, 5b, 5c, 5d at high velocity.

In operation, the mixtures formed in the carburetor bodies 13, 14 are fed into the respective intake ports 5a, 5b and 5c, 5d via the corresponding mixture passages 15, 16. Assuming that the No. 2 cylinder 2b is now in the intake stroke, the mixture is spouted from the branch connecting passage 30b into the intake port 5b at high velocity as mentioned above. Since the opening of the branch connecting passage 30b is directed to the valve gap formed between the intake valve 3b and its valve seat when the intake valve 3b is opened, the mixture spouted from the channel branch 30b passes through the above-mentioned valve gap and then flows into the combustion chamber 10 at high velocity. As a result, the mixture flowing into the combustion chamber 10 causes a swirl motion shown by the arrow W in FIG. 1 in the combustion chamber 10. As a result of this swirl motion, burning velocity is considerably increased and stable combustion can thus be obtained.

As is illustrated in FIG. 2, the intake port 5b comprises a substantially horizontally extending port portion 31 and a downwardly extending port portion 32 which is inclined downwardly towards the combustion chamber 10. It is preferable that the outlet of the branch connecting passage 30b open on the inclined bottom wall of the port portion 32. Since separation of the stream of the mixture flowing in the intake port 5b takes place on the inclined bottom wall of the port portion 32 at the time of the intake stroke, the level of the vacuum produced on the inclined bottom wall of the port portion 32 is higher than the level of the vacuum produced in any other region in the intake port 5b. In addition, at the time immediately before the intake valve 3b is closed, since the mixture in the combustion chamber 10 is blown back into the intake port 5b due to the upward movement of the piston 8, the intake port pressure becomes positive, as illustrated in FIG. 3. By arranging the opening of the channel branch 30b as mentioned above, this positive pressure acts directly on the opening of the channel branch 30b. The arrangement is the same for the other intake ports 5a, 5c, and 5d. As a result, when the No. 2 cylinder is in the intake stroke, for example the difference between the intake port pressures acting on the openings of the branch connecting passages 30b, 30d becomes large since the openings of the channel branches 30b, 30d are arranged on the inclined bottom wall of the intake ports 5b, 5d, respectively, so that the flow velocity of the mixture spouted from the channel branch 30b is increased. This increases the swirl motion created in the combustion chamber 10. In addition, since the mixture flows within the common connecting channel 29 from a given cylinder towards one of the remaining cylinders, mixing of the mixture is improved, and the distribution of fuel to each cylinder becomes uniform.

Figure 4:
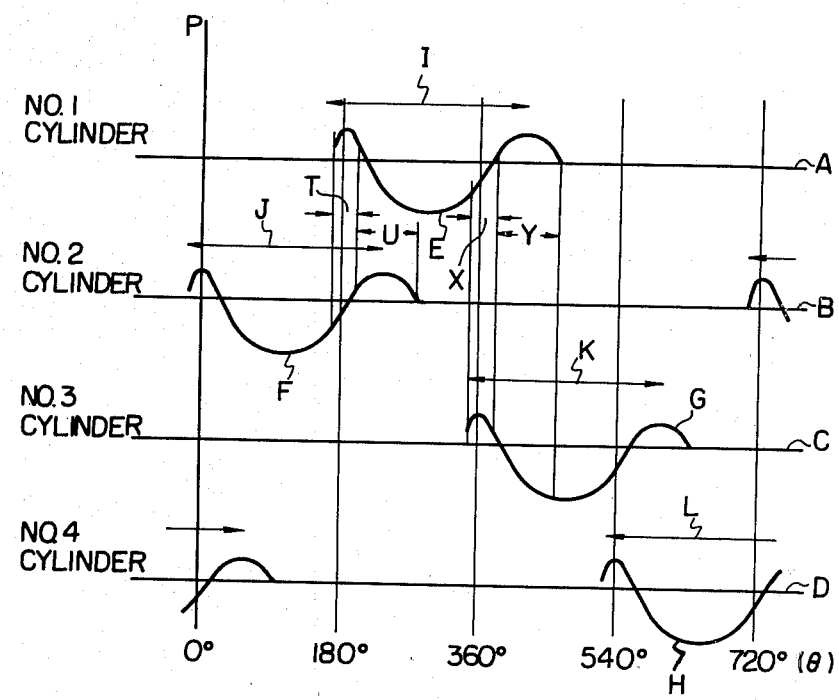
FIG. 4 is a graph showing changes in pressure in the intake port located at a position near the rear face of the valve head of the intake valve when the engine is operating at low speed.

FIG. 4 illustrates changes in the intake port pressure in the case wherein an engine is operating at low speed. In this case, the positive intake port pressure produced immediately after the intake valve is opened is higher than in the case illustrated in FIG. 3, and at the time immediately before the intake valve is closed, the vacuum produced in the intake port remains for a little while after the piston begins to move upwards. Consequently, when an engine is operating at low speed, it will be understood from FIG. 4 that the mixture is fed into the intake port 5b of the No. 2 cylinder from the intake port 5a of the No. 1 cylinder in the range T of the crank angle; the mixture is fed into the intake port 5a of No. 1 cylinder from the intake port 5b of the No. 2 cylinder in the range U of the crank angle; the mixture is fed into the intake port 5a of the No. 1 cylinder from the intake port 5c of the No. 3 cylinder in the range X of the crank angle; and the mixture is fed into the intake port 5c of the No. 3 cylinder from the intake port 5a of the No. 1 cylinder in the range Y of the crank angle. Thus, when an engine is operating at low speed and, for example, the No. 1 cylinder is in the intake stroke, since the mixture is fed into the intake port 5a of the No. 1 cylinder from the intake port 5b of the No. 2 cylinder during range U of the crank angle and from the intake port 5c of the No. 3 cylinder during range X of the crank angle, an extremely strong swirl motion is produced in the combustion chamber 10.

Figure 5:
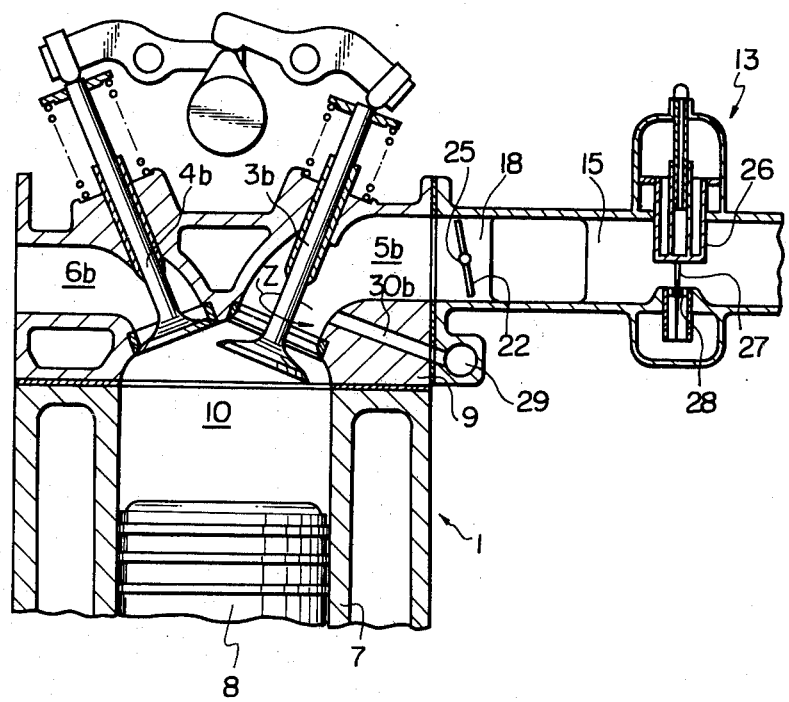
FIG. 5 is a cross-sectional side view of another embodiment according to the present invention.

FIG. 5 illustrates another embodiment according to the present invention. In this embodiment, the common passage 29 is arranged at a position which is lower than that of the common passage 29 illustrated in FIG. 2, and the branch connecting passage 30b is obliquely arranged so that it extends in a plane perpendicular to the axis of the intake valve 3b. The opening of the branch connecting passage 30b is tangentially connected to the inner wall of the intake port 5b, which wall extends circumferentially about the axis of the intake valve 3b. In this embodiment, the mixture spouted from the branch connecting passage 30b at the time of the intake stroke swirls in the intake port 5b about the axis of the intake valve 3b as illustrated by the arrow Z in FIG. 5, and then the mixture, while swirling, flows into the combustion chamber 10. As a result of this arrangement, a strong swirl motion is produced in the combustion chamber 10.

As mentioned above, FIGS. 3 and 4 indicate changes in the intake port pressure, that is, the pressure produced in the intake port at a position near the rear face of the valve head of the intake valve. Since both the positive pressure and the vacuum produced in the intake port are gradually attenuated during the time they propagate towards the carburetor bodies 13, 14, both the positive pressure and the vacuum produced in the intake passages 15, 16 become low. However, as is illustrated in FIGS. 2 and 5, since each of the branch connecting passages 30a, 30b, 30c, 30d opens into a respective one of the intake ports 5a, 5b, 5c, 5d at a position near the rear face of the valve head of the corresponding intake valve 3a, 3b, 3c, 3d, the intake port pressure directly acts on the opening of the respective branch connecting passage 30a, 30b, 30c, 30d. Consequently, the pressure difference between the positive pressure and the vacuum which act on the openings of the branch connecting passages 30a, 30b, 30c, 30d will be larger than in the case wherein the branch connecting passages 30a, 30b, 30c, 30d open into the intake passages 15, 16 or the intake ports 5a, 5b, 5c, 5d at a position remote from the valve head of the intake valves 3a, 3b, 3c, 3d. In addition, as illustrated in FIGS. 2 and 5, by locating the throttle valves 21, 22, 23, 24 at the outlets of the branch intake passages 17, 18, 19, 20, the positive pressure which is caused by blowing the mixture back into the intake port is maintained without being attenuated. As a result of this, since the pressure difference between the positive pressure and the vacuum which act on the openings of the branch connecting passages 30a, 30b, 30c, 30d is maintained at a large pressure difference for a long time, it is possible to produce an extremely strong swirl motion in the combustion chamber 10.

Figure 6:
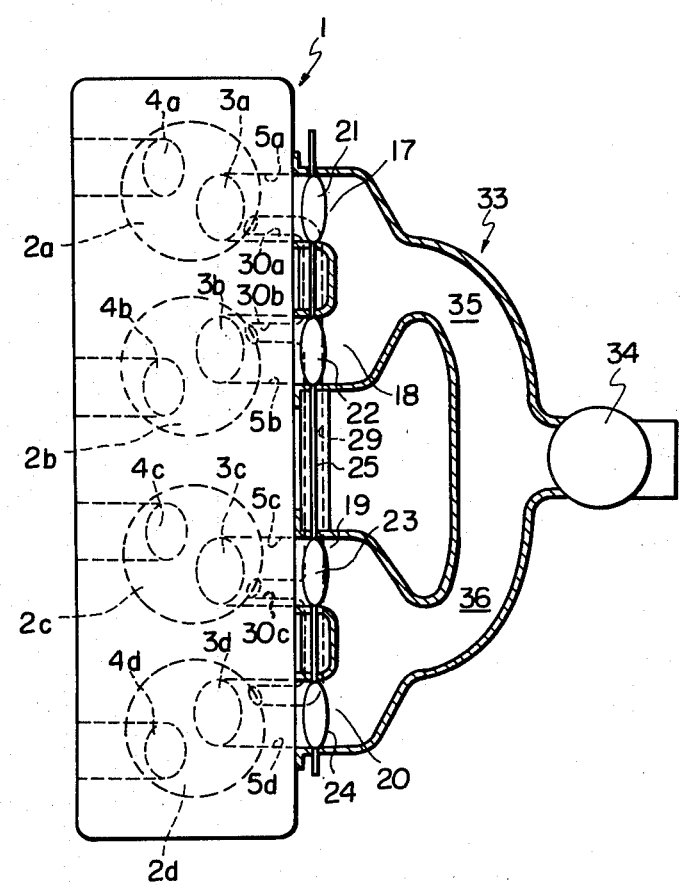
FIG. 6 is a plan view, partly in cross-section, of a further embodiment according to the present invention.

FIG. 6 illustrates a further embodiment according to the present invention. In this embodiment, a single variable venturi type carburetor body 34 having a construction which is the same as that of the carburetor body 13 illustrated in FIG. 2 is arranged in a carburetor housing 33. The outlet passage of the carburetor body 13 is divided into two intake passages 35, 36, and each of the intake passages 35, 36 is divided into two respective branch intake passages 17, 18, 19, 20. Each of the throttle valves 21, 22, 23, 24 is arranged in a respective one of the branch intake passages 17, 18, 19, 20. In this embodiment, there is an advantage in that the number of the carburetor bodies can be reduced as compared with the case illustrated in FIG. 1.

Figure 7:
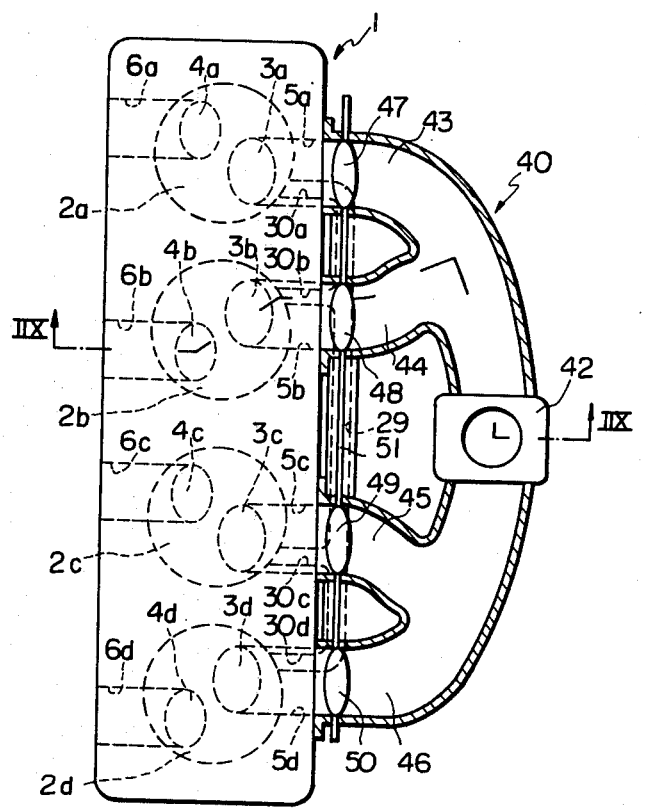
FIG. 7 is a plan view, partly in cross-section, of a still further embodiment according to the present invention.
Figure 8:
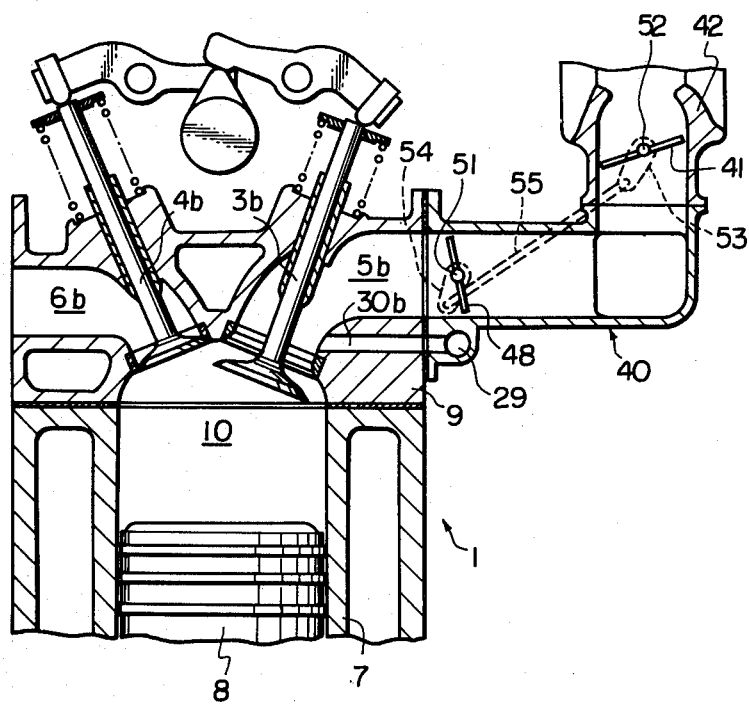
FIG. 8 is a cross-sectional side view taken along the line IIX—IIX in FIG. 7.

FIGS. 7 and 8 illustrate a still further embodiment according to the present invention. Referring to FIGS. 7 and 8, an intake manifold 40 is fixed onto the engine body 1, and a carburetor 42 having a throttle valve 41 is mounted on the intake manifold 40. The intake manifold 40 comprises manifold branches 43, 44, 45, 46 which are connected to the intake ports 5a, 5b, 5c, 5d, respectively. Secondly throttle valves 47, 48, 48, 50 are arranged in the outlets of the manifold branches 43, 44, 45, 46, respectively, and attached onto a common valve shaft 51. As is illustrated in FIG. 8, an arm attached onto a valve shaft 52 of the throttle valve 41 is interconnected to an arm 54 attached onto the common valve shaft 51 by means of a link 55 so that the secondary throttle valves 47, 48, 49, 50 are gradually opened as the throttle valve 41 is gradually opened. In this embodiment, the changes in pressure produced in each intake port at a position near the rear face of the valve head of the intake valve are as shown in FIGS. 3 and 4. Consequently, since the mixture is spouted from the channel branches 30a, 30b, 30c, 30d into the combustion chamber 10 at a high speed, a strong swirl motion is created in the combustion chamber 10. In addition, in either of the above-described embodiments, it is possible to recirculate the exhaust gas into the common connecting channel 29.

According to the present invention, by adopting simple construction wherein each of the intake ports is connected by an opening located at a position near the rear face of the valve head of the corresponding intake valves to the common passage via the respective branch connecting passage, it is possible to produce a strong swirl motion in the combustion chamber. As a result, burning velocity can be increased independently of the engine speed when the engine is operating under light load, while ensuring a high volumetric efficiency when the engine is operating at high speed under heavy load.

While the invention has been described with reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine which includes:
    a cylinder block having a plurality of cylinders, each cylinder having a combustion chamber;
    a cylinder head having a plurality of intake ports, each port leading to a respective combustion chamber through an intake valve which has a valve head;
    an intake manifold having at least one intake passage common to at least two of said cylinders, said intake passage comprising a collecting portion having an inlet and at least two branch intake passages branched off from said collecting portion, each of said branch intake passages being connected to a respective one of said combustion chambers via a corresponding one of said intake ports;
    at least two branch connecting passages, each branch connecting passage having an opening into a respective one of said at least two branch intake passages;
    a common passage connecting said at least two branch connecting passages; and
    valve means arranged in each of said branch intake passages at a location upstream of the openings of said branch connecting passages and opened in accordance with an increase in the level of the load of said engine, wherein the improvement comprises:
    each intake port having a substantially horizontal portion connected to the respective branch intake passage and a downwardly inclined portion extending to the respective intake valve,
    the opening of each of said branch connecting passages being located on the bottom wall of said downwardly inclined portion of the respective intake port in the vicinity of the corresponding intake valve head, and
    said common passage being a blind passage communicating only with said at least two branch connecting passages, whereby each branch connecting passage during the intake stroke of its respective cylinder spouts gaseous matter drawn only from at least one other intake port via the at least one other branch connecting passage and the common passage.

2. A multi-cylinder internal combustion engine as claimed in claim 1, wherein said common passage has a cross-sectional area which is smaller than that of each of said branch intake passages.

3. A multi-cylinder internal combustion engine as claimed in claim 1, wherein each of said branch connecting passages has a cross-sectional area which is smaller than that of each branch intake passage.

4. A multi-cylinder internal combustion engine as claimed in claim 1, wherein the opening of each of said branch connecting passages is directed to a valve gap formed between said corresponding intake valve and a valve seat thereof when said intake valve is opened.

5. A multi-cylinder internal combustion engine as claimed in claim 1, wherein the opening of each of said branch connecting passages is tangentially connected to an inner wall of said respective branch intake passage, said wall extending circumferentially about an axis of said corresponding intake valve.

6. A multi-cylinder internal combustion engine as claimed in claim 1, wherein said valve means comprises at least two throttle valves, each being arranged in a respective one of said branch intake passages.

7. A multi-cylinder internal combustion engine as claimed in claim 6, wherein said throttle valves are attached onto a common throttle shaft.

8. A multi-cylinder internal combustion engine as claimed in claim 6, wherein each of said throttle valves is arranged at a position near the respective intake valve.

9. A multi-cylinder internal combustion engine as claimed in claim 8, wherein said intake manifold further comprises at least one carburetor housing formed therein, and said at least two branch intake passages each having an outlet which is connected to said respective combustion chamber via said corresponding intake port, each of said throttle valves being arranged in said outlet of said respective branch intake passage.

10. A multi-cylinder internal combustion engine as claimed in claim 1, wherein said engine further comprises a throttle valve arranged in said intake passage upstream of said valve means, said valve means being operatively connected to said throttle valve for increasing the opening degree of said valve means in accordance with an increase in the opening degree of said throttle valve.

11. A multi-cylinder internal combustion engine as claimed in claim 10, wherein said valve means is mechanically connected to said throttle valve by means of a link mechanism.

12. A multi-cylinder internal combustion engine as claimed in claim 10, said intake manifold has at least two outlets, said valve means comprising at least two throttle valves each being arranged in the respective outlet of said intake manifold.

13. A multi-cylinder internal combustion engine according to claim 1 wherein the at least two branch connecting passages connected by the common passage open into intake ports of cylinders having overlapping intake valve opening periods in the vicinity of the respective intake valves, such that the end of the opening period in one of said intake ports, marking the start of the compression stroke in its cylinder, coincides with the intake stroke in the cylinder of the other intake port, whereby the maximum possible pressure differential is obtained from the one intake port to the other intake port.

14. A multi-cylinder internal combustion engine according to claim 1 wherein the engine is a four stroke cycle engine, each cylinder of the engine having a branch connecting passage, and the common passage connects all the branch connecting passages.

15. A multi-cylinder internal combustion engine according to claim 14 wherein the engine has at least four cylinders.

* * * * *

UNITED STATES PATENT AND TRADEMARK OFFICE
CERTIFICATE OF CORRECTION

PATENT NO. : 4,314,529

DATED : February 9, 1982

INVENTOR(S) : Katsuhiko Motosugi, et al

It is certified that error appears in the above—identified patent and that said Letters Patent is hereby corrected as shown below:

Col. 1, line 33, after "comprises" insert --both--.

Col. 1, line 47, after "engine" insert -- , --.

Col. 2, line 7, before "valves" insert --intake--.

Col. 3, lines 22-23, change "connecting" to --connected--.

Col. 4, line 19, change "channel" to --passage--.

Col. 4, line 24, after "branch" insert --connecting passage--.

Col. 5, line 4, after "example" insert --,--.

Signed and Sealed this

Twenty-fifth Day of May 1982

[SEAL]

Attest:

Attesting Officer

GERALD J. MOSSINGHOFF

Commissioner of Patents and Trademarks